US006957955B2

(12) United States Patent
Kobayashi et al.

(10) Patent No.: US 6,957,955 B2
(45) Date of Patent: *Oct. 25, 2005

(54) OXYGEN ENHANCED LOW NOX COMBUSTION

(75) Inventors: Hisashi Kobayashi, Putnam Valley, NY (US); Lawrence E. Bool, III, Hopewell Junction, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/322,659

(22) Filed: Dec. 19, 2002

(65) Prior Publication Data

US 2003/0108833 A1 Jun. 12, 2003

Related U.S. Application Data

(63) Continuation of application No. 10/195,764, filed on Jul. 15, 2002, which is a continuation of application No. 09/757,611, filed on Jan. 11, 2001, now abandoned.

(51) Int. Cl.[7] .................................................. F23M 3/04

(52) U.S. Cl. .............................. 431/10; 431/8; 110/345

(58) Field of Search .............................. 431/10, 8, 351; 110/344, 345, 348

(56) References Cited

U.S. PATENT DOCUMENTS

| | | | |
|---|---|---|---|
| 3,656,878 | A | 4/1972 | Wright |
| 3,820,320 | A | 6/1974 | Schirmer et al. |
| 3,826,079 | A | 7/1974 | Quigg et al. |
| 3,873,671 | A | 3/1975 | Reed et al. |
| 4,193,773 | A | 3/1980 | Staudinger |
| 4,329,932 | A | 5/1982 | Takahashi et al. |
| 4,343,606 | A | 8/1982 | Blair et al. |
| 4,388,062 | A | 6/1983 | Bartok et al. |
| 4,408,982 | A | 10/1983 | Kobayashi et al. |
| 4,427,362 | A | 1/1984 | Dykema |
| 4,488,866 | A | 12/1984 | Schirmer et al. |
| 4,495,874 | A | 1/1985 | Greskovich et al. |
| 4,515,095 | A | 5/1985 | Greskovich |
| 4,541,796 | A | 9/1985 | Anderson |
| 4,556,384 | A | 12/1985 | Laurenceau et al. |

(Continued)

FOREIGN PATENT DOCUMENTS

| | | |
|---|---|---|
| DE | 4142401 | 6/1993 |
| EP | 0187441 | 7/1986 |
| EP | 0635590 | 11/1994 |

OTHER PUBLICATIONS

Michelfelder, S. et al., "Transfert de chaleur et pollution", Revue Generale De Thermique, No. 196 (Apr. 1978), p. 324 (with translation).

Sarofim, A.F. et al., "Strategies For Controlling Nitrogen Oxide Emissions During Combustion Of Nitrogen–Bearing Fuels", The American Institute of Chemical Engineers, (1978), No. 175, vol. 74, pp. 67–92.

Timothy, L.D. et al., "Characteristics Of Single Particle Coal Combustion", 19$^{th}$ Symposium on Combustion, The Combustion Institute (1982), pp. 1123–1130.

(Continued)

*Primary Examiner*—Alfred Basichas
(74) *Attorney, Agent, or Firm*—Donald T. Black

(57) ABSTRACT

Fuel such as coal is combusted by feeding fuel and gaseous oxidant containing more than 21 vol. % oxygen, and preferably 21.8 to 29 vol. % oxygen, to a combustion stage at a stoichiometric ratio below that at which, if the stage were operated with air as the only oxidant, the same amount of NOx would be produced, and combusting the fuel and oxidant in said stage to produce combustion products and unburned fuel.

80 Claims, 1 Drawing Sheet

U.S. PATENT DOCUMENTS

| | | | | | |
|---|---|---|---|---|---|
| 4,591,331 | A | | 5/1986 | Moore | |
| 4,596,198 | A | | 6/1986 | Greskovich et al. | |
| 4,654,001 | A | | 3/1987 | LaRue | |
| 4,761,132 | A | | 8/1988 | Khinkis | |
| 4,797,087 | A | | 1/1989 | Gitman | |
| 4,863,371 | A | | 9/1989 | Ho | |
| 4,878,830 | A | | 11/1989 | Henderson | |
| 4,899,670 | A | | 2/1990 | Hansel | |
| 4,917,727 | A | | 4/1990 | Saito et al. | |
| 4,946,382 | A | | 8/1990 | Kobayashi et al. | |
| 4,957,050 | A | | 9/1990 | Ho | |
| 4,969,814 | A | | 11/1990 | Ho et al. | |
| 4,973,346 | A | | 11/1990 | Kobayashi | |
| 4,988,285 | A | | 1/1991 | Delano | |
| 5,000,102 | A | | 3/1991 | Ho | |
| 5,076,779 | A | | 12/1991 | Kobayashi | |
| 5,085,156 | A | | 2/1992 | Dykema | |
| 5,158,445 | A | | 10/1992 | Khinkis | |
| 5,186,617 | A | | 2/1993 | Ho | |
| 5,195,450 | A | | 3/1993 | Marion | |
| 5,201,650 | A | | 4/1993 | Johnson | |
| 5,203,859 | A | | 4/1993 | Khinkis et al. | |
| 5,213,492 | A | | 5/1993 | Ho | |
| 5,242,296 | A | | 9/1993 | Tuson et al. | |
| 5,266,025 | A | | 11/1993 | Francis, Jr. et al. | |
| 5,291,841 | A | * | 3/1994 | Dykema | 110/347 |
| 5,308,239 | A | | 5/1994 | Bazarian et al. | |
| 5,387,100 | A | | 2/1995 | Kobayashi | |
| 5,411,394 | A | | 5/1995 | Beer et al. | |
| 5,413,476 | A | | 5/1995 | Baukal, Jr. et al. | |
| 5,431,559 | A | | 7/1995 | Taylor | |
| 5,439,373 | A | | 8/1995 | Anderson et al. | |
| 5,454,712 | A | | 10/1995 | Yap | |
| 5,580,237 | A | | 12/1996 | Leger | |
| 5,601,425 | A | | 2/1997 | Kobayashi et al. | |
| 5,609,662 | A | | 3/1997 | Kobayashi et al. | |
| 5,611,682 | A | | 3/1997 | Slavejkov et al. | |
| 5,611,683 | A | | 3/1997 | Baukal, Jr. et al. | |
| 5,697,306 | A | | 12/1997 | LaRue et al. | |
| 5,724,897 | A | | 3/1998 | Breen et al. | |
| 5,725,366 | A | | 3/1998 | Khinkis et al. | |
| 5,755,818 | A | | 5/1998 | Tuson et al. | |
| 5,832,847 | A | | 11/1998 | Leisse et al. | |
| 5,857,846 | A | | 1/1999 | Sattelmayer et al. | |
| 5,871,343 | A | | 2/1999 | Baukal et al. | |
| 5,904,475 | A | | 5/1999 | Ding | |
| 5,924,858 | A | | 7/1999 | Tuson et al. | |
| 5,931,654 | A | | 8/1999 | Chamberland | |
| 5,937,770 | A | | 8/1999 | Kobayashi et al. | |
| 5,960,724 | A | | 10/1999 | Toqan | |
| 6,007,326 | A | | 12/1999 | Ryan, III et al. | |
| 6,030,204 | A | * | 2/2000 | Breen et al. | 431/4 |
| 6,085,674 | A | | 7/2000 | Ashworth | |
| 6,113,389 | A | | 9/2000 | Joshi et al. | |
| 6,164,221 | A | | 12/2000 | Facchiano et al. | |
| 6,171,100 | B1 | | 1/2001 | Joshi et al. | |
| 6,200,128 | B1 | | 3/2001 | Kobayashi | |
| 6,206,949 | B1 | | 3/2001 | Kobayashi et al. | |
| 6,217,681 | B1 | | 4/2001 | Bazarian et al. | |
| 6,244,200 | B1 | | 6/2001 | Rabovitser et al. | |
| 6,276,928 | B1 | | 8/2001 | Joshi et al. | |
| 6,289,851 | B1 | | 9/2001 | Rabovitser et al. | |
| 6,314,896 | B1 | | 11/2001 | Marin | |
| 6,325,003 | B1 | * | 12/2001 | Ashworth et al. | 110/345 |
| 6,357,367 | B1 | * | 3/2002 | Breen et al. | 110/345 |
| 6,394,790 | B1 | | 5/2002 | Kobayashi | |
| 6,398,546 | B1 | | 6/2002 | Kobayashi | |
| 6,409,499 | B1 | | 6/2002 | Feldermann | |
| 6,519,973 | B1 | | 2/2003 | Hoke, Jr. et al. | |
| 6,659,762 | B2 | | 12/2003 | Borders et al. | |

OTHER PUBLICATIONS

Farmayan, W.F. et al., "$NO_x$ and Carbon Emission Control in Coal–Water Slurry Combustion", Sixth International Symposium on Coal Slurry Combustion and Technology, Orlando, FL, (1984).

"Oxygen Enriched Air/Natural Gas Burner System Development", Final Report, Gas Research Institute (1989), pp. 140 and 186–189.

Kobayashi, H. et al., "$NO_x$ Emission Characteristics of Industrial Burners and Control Methods Under Oxygen Enriched Combustion Conditions", International Flame Research Foundation, $9^{th}$ Members Conference, Noordwijkerhout (1989).

Baukal, C.E. et al., "$NO_x$ Measurements In Oxygen–Enriched, Air–Natural Gas Combustion Systems", Fossil Fuel Combustion Symposium, (Amer. Soc. Mech. Eng., 1990), pp. 75–79.

Baukal, C.E. et al., "Oxygen Enrichment Enhances Combustion", Air Products and Chemicals, Inc., (before 1992), pp. 17–23.

Panahi, S.K. et al., "Low–$NO_x$ Technologies For Natural Gas–Fired Regenerative Glass Melters", presented at Scandinavian Society of Glass Technology, Institute of Gas Technology (1992), pp. 1–15.

"Catalog of Technical Reports", Gas Research Institute, (Dec. 1992).

Campbell, D.A. et al., "Oxy–coal injection at Cleveland Ironworks", Ironmaking and Steelmaking (1992), vol. 19 No. 2, pp. 120–125.

Riley, M.F., et al. "Effect of Direct Oxygen Injection on Combustion of Injected Coal", Proc. $2^{nd}$ Internat. Cong.on the Sci. and Tech. of Ironmaking, ISS (1998), pp. 683–688.

Eddings, E.G. et al. "Advances in the Use of Computer Simulations for Evaluating Combustion Alternatives", presented at the $3^{rd}$ CREST International Symposium on High Temperature Air Combustion and Gasification, Yokohama, Japan (Mar. 2000).

Bose, A.C. et al., "Coal Composition Effects on Mechanisms Governing the Destruction of NO and Other Nitrogenous Species during Fuel–Rich Combustion", Energy & Fuels, vol. 2, pp. 301–308 (1988).

Sarofim, A.F. et al., "Strategies for Controlling Nitrogen Oxide Emissions during Combustion of Nitrogen–Bearing Fuels", $69^{th}$ Annual Meeting of American Institute of Chemical Engineers, Chicago, IL, pp. 67–92 (1976).

* cited by examiner

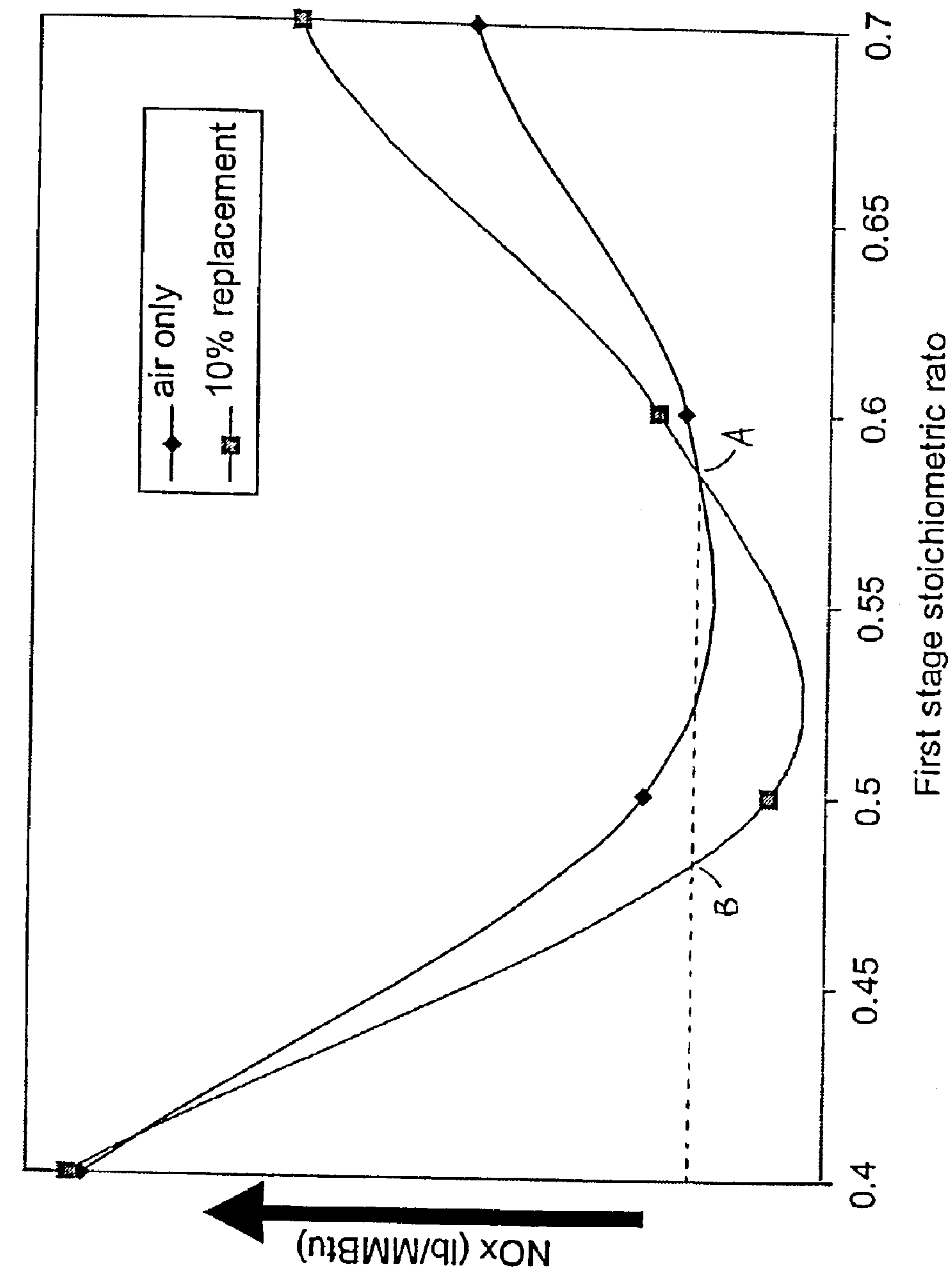
air only
10% replacement
A
B
0.4
0.45
0.5
0.55
0.6
0.65
0.7
First stage stoichiometric rato
NOx (lb/MMBtu)

OXYGEN ENHANCED LOW NOX COMBUSTION

This application is a Continuation of prior U.S. application Ser. No. 10/195,764 Filing Date Jul. 15, 2002 which is a continuation of application Ser. No. 09/757,611 Filing Date: Jan. 11, 2001 now abandoned.

FIELD OF THE INVENTION

The present invention relates to combustion of hydrocarbon fuels, particularly of coal.

BACKGROUND OF THE INVENTION

Environmental awareness is growing in the U.S. and around the world leading to increasing public and regulatory pressures to reduce pollutant emissions from boilers, incinerators, and furnaces. One pollutant of particular concern is NOx (by which is meant individual oxides of nitrogen such as but not limited to NO, $NO_2$, $N_2O$, $N_2O_4$, and mixtures thereof), which has been implicated in acid rain, ground level ozone, and fine particulate formation.

A number of technologies are available to reduce NOx emissions. These technologies can be divided into two major classes, primary and secondary. Primary technologies minimize or prevent NOx formation in the combustion zone by controlling the combustion process. Secondary technologies use chemicals to reduce NOx formed in the combustion zone to molecular nitrogen. The current invention is a primary control technology.

In primary control technologies, commonly called staged combustion, mixing between the combustion air and fuel is carefully controlled to minimize NOx formation. The formation of NOx from fuel nitrogen is based on a competition between the formation of NOx and the formation of $N_2$ from the nitrogenous species in the fuel volatiles and char nitrogen. Oxygen rich conditions drive the competition towards NOx formation. Fuel rich conditions drive the reactions to form $N_2$. Primary control strategies take advantage of this phenomenon by carefully controlling the mixing of air and fuel to form a fuel rich region to prevent NOx formation. To reduce NOx emissions, the fuel rich region must be hot enough to drive the NOx reduction kinetics. However, sufficient heat has to be transferred from the fuel rich first stage to the furnace heat load in order to prevent thermal NOx formation in the second stage.

By far the most common type of primary control device is the low NOx burner (LNB). In this device the air is typically aerodynamically staged to form a fuel rich zone followed by a burnout zone. A conventional low NOx burner includes a first zone, near the feed orifice, which is controlled by primary air and fuel, and which is very fuel rich. In a second zone, the remainder of the secondary air and any tertiary air then allow the fuel nitrogen to continue to be chemically processed to form $N_2$ provided that the local stoichiometrics are rigidly controlled. In this region the hydrocarbons and the char are burned out. Although the LNB is a fairly inexpensive way to reduce NOx, currently available versions are not yet capable to reach the emissions limits in pending regulations. Other issues are increased carbon in the ash and reduced flame stability.

Low NOx burners represent a fairly mature technology and as such are discussed widely throughout the patent and archival literature. Many ideas have been proposed to enhance the effectiveness of LNB's while minimizing detrimental impacts such as poor flame stability and increased carbon in the ash. Of these ideas two are particularly relevant: preheating the air to the first stage, and converting the combustor to oxy-fuel firing.

Both air preheat and oxy-fuel combustion enhance the effectiveness of staged combustion by increasing the temperature in the primary zone without increasing the stoichiometric ratio. Oxy-fuel combustion offers the additional advantage of longer residence times in the fuel rich region, due to lower gas flows, which has been shown to reduce NOx emissions. As discussed above, staged combustion uses a fuel rich stage to promote the formation of $N_2$ rather than NOx. Since the reactions to form $N_2$ are kinetically controlled, both the temperature and the hydrocarbon radical concentration are critical to reducing NOx formation. For example, if the temperature is high and the radical concentration is low, such as under unstaged or mildly staged conditions, NOx formation is increased. When the radical concentration is high but the temperature is low, such as under deeply staged conditions, the conversion of intermediate species such as HCN to $N_2$ is retarded. When air is added to complete burnout, the intermediates oxidize to form NOx, therefore the net NOx formation is increased. Sarofim at al. "Strategies for Controlling Nitrogen Oxide Emissions During Combustion of Nitrogen bearing fuels", $69^{th}$ Annual Meeting of the AIChE, Chicago, Ill., November 1976, and others have suggested that the first stage kinetics can be enhanced by preheating the combustion air to fairly high temperatures. Alternately Kobayashi et al. ("NOx Emission Characteristics of Industrial Burners and Control Methods Under Oxygen Enriched Combustion Conditions", International Flame Research Foundation $9^{th}$ Members' Conference, Noordwijkerhout, May 1989), suggested that using oxygen in place of air for combustion would also increase the kinetics. In both cases the net result is that the gas temperature in the first stage is increased while the radical concentration stays the same, resulting in reduced NOx formation. Further, using both air preheat and oxy-fuel firing allows the first stage to be more deeply staged without degrading the flame stability. This allows even further reductions in NOx formation.

Oxy-fuel firing offers a further advantage for LNB's. Timothy et al ("Characteristics of Single Particle Coal Combustion", $19^{th}$ Symposium (international) on Combustion, The Combustion Institute, 1983) showed that devolatilization times are significantly reduced, and the volatile yield is increased, when coal is burned in oxygen enriched conditions. These tests were single particle combustion tests performed under highly fuel lean conditions, which does not provide information on how much oxygen is needed to accomplish this under more realistic combustion conditions. The higher volatile yield means that the combustibles in the gas phase increase as compared to the baseline—leading to a more fuel rich gas phase which inhibits NOx formation from the volatile nitrogen species. In addition, the fuel volatiles ignite rapidly and anchor the flame to the burner, which has been shown to lower NOx formation. The enhanced volatile yield also leads to shorter burnout times since less char is remaining.

Although the prior art describes several elegant enhancements for staged combustion and LNB's, several practical problems have limited their application. First, preheating the combustion air to the levels required to enhance the kinetics requires several modifications to both the system and the air piping. The air heater and economizer sections must be modified to allow the incoming air to be heated to higher temperatures, which may require modifications to the rest of the steam cycle components. The ductwork and windbox, as well as the burner itself, must also be modified to handle the hot air. All of the modifications can be costly and can have a negative impact on the operation of the boiler.

The primary barrier to the use of oxy-fuel firing in boilers has been the cost of oxygen. In order for the use of oxygen to be economic the fuel savings achieved by increasing the process efficiency must be greater than the cost of the supplied oxygen. For high temperature operations, such as furnaces without significant heat recovery, this is easily achieved. However, for more efficient operations, such as boilers, the fuel savings attainable by using oxy-fuel firing is typically much lower than the cost of oxygen. For example, if a typical coal-fired utility boiler were converted from air firing to oxygen firing, approximately 15 to 20% of the power output from that boiler would be required to produce the necessary oxygen. Clearly, this is uneconomic for most boilers.

Thus there remains a need for a method for achieving reduced NOx emissions in combustion of fuel (particularly coal) containing one or more nitrogenous compounds and especially for a method which can be carried out in existing furnaces without requiring extensive structural modifications.

BRIEF SUMMARY OF THE INVENTION

An aspect of the present invention is a method for combusting fuel which contains one or more nitrogenous compounds, comprising:

feeding into a first combustion stage fuel which contains one or more nitrogenous compound and gaseous oxidant containing more than 21 vol. % oxygen, and preferably 21.8 to 29 vol. % oxygen, at a stoichiometric ratio below that at which, if the stage were operated with air as the only oxidant, the same amount of NOx would be produced, and combusting said fuel in said combustion stage to produce combustion products and unburned fuel.

Preferably, said unburned fuel is combusted in a second combustion stage using additional oxidant stream(s) comprised such that the average oxygen content of all oxidant streams, including those fed to the first stage, is in the range of 20.9–27.4 vol. % oxygen while removing sufficient heat from the combustion products and unburned fuel from the first stage, such as through heat exchange with steam producing tubes, to reach a temperature low enough to minimize additional formation of NOx in said combustion in said second stage.

Another aspect of the invention is that it enables ready adaptation ("retrofitting") of existing furnaces, in which a hydrocarbon fuel is combusted with air as the only oxidant, to reduce the amount of NOx formed by the furnace. This embodiment is a method for operating a furnace in which a hydrocarbon fuel is combusted, so as to reduce the amount of NOx formed by the furnace compared to the amount of NOx formed by combustion of said fuel in said furnace with air as the only oxidant, the method comprising:

feeding into a first combustion stage of said furnace fuel which contains one or more nitrogenous compounds and gaseous oxidant containing more than 21 vol. % oxygen, at a stoichiometric ratio below that at which, if the stage were operated with air as the only oxidant, the same amount of NOx would be produced, and combusting said fuel with said gaseous oxidant in said combustion stage to produce combustion products and unburned fuel.

In either of the foregoing embodiments, the oxygen can be fed as either a single stream of pure oxygen or of substantially oxygen-enriched air, or as a plurality of streams of pure oxygen and/or substantially oxygen-enriched air.

BRIEF DESCRIPTION OF THE DRAWINGS

The FIGURE is a graph of NOx formation plotted against the stoichiometric ratio in the first stage of a staged furnace.

DETAILED DESCRIPTION OF THE INVENTION

The current invention overcomes the aforementioned hurdles while enhancing the effectiveness of staged combustion. It is also useful in single stage burners. This invention is applicable to combustion of hydrocarbon fuels such as coal, fuel oil (including heavy oil), and bitumen. Such fuels generally contain a minor amount of naturally occurring nitrogenous hydrocarbon compounds, typically heterocyclics.

In the following description, it should be understood that the oxygen content of the oxidant fed to a stage of a combustion device represents the overall average oxygen content taking the stage as a whole, even though within the stage the oxygen content can vary at different given points.

The current invention takes advantage of the discovery that within certain ranges and ratios of oxygen and fuel, using a surprisingly small amount of oxygen leads to a significant reduction of the formation of NOx, thus eliminating the need for extensive boiler modifications or the cost of pure oxy-fuel firing as modes of reducing NOx formation.

More specifically, it has been determined that, as expected from the relevant teachings of the prior art, at stoichiometric ratios conventionally observed for the first stage of staged combustion in air, raising the oxygen content of the air increases the formation of NOx. As used herein, "stoichiometric ratio" is the ratio of oxygen fed, to the total amount of oxygen that would be necessary to convert fully all carbon, sulfur and hydrogen present in the substances comprising the feed to carbon dioxide and sulfur dioxide, and water.

However, and quite surprisingly, it has been discovered that there are lower stoichiometric ratios having the property that combustion at such lower stoichiometric ratios accompanied by a relatively slight increase in the overall oxygen content of the oxidant gas results in a significant decrease in the formation of NOx.

At a certain point representing a certain value of the stoichiometric ratio for a given set of combustion conditions, and for a given overall oxygen content, somewhat higher than that of air, in the oxidant gas, the NOx formation as expressed in mass per unit fuel input will be the same whether combustion is carried out in air or in that oxidant gas. This point will be referred to herein as the "inflection point"; this term is chosen to help promote understanding of the description herein of the invention and no additional implication should be attached to the particular word "inflection". The particular value of the stoichiometric ratio at the inflection point can be expected to vary from case to case depending e.g. on the fuel composition and on the overall oxygen content of the oxidant. The present invention carries out combustion in the first stage (or in the fuel rich portion of a staged combustor) at stoichiometric ratios below the stoichiometric ratio at that point.

As an example, the impact of oxygen addition on NOx formation is shown schematically in the FIGURE. This figure, derived through the use of chemical kinetics calculations where the volume and heat removal from the primary zone were kept constant, shows two curves that depict the NOx formation as a function of the first stage stoichiometric ratio when the oxidant was air, and when 10% of the oxygen required for complete combustion of the fuel was supplied by pure oxygen and this oxygen was fed into the first (fuel rich) stage. The fuel used for these calculations was a typical bituminous coal with a 34% volatile matter content. The FIGURE shows a point "A" at which the two curves intersect, which is the point at which NOx formation is the same when combustion is carried out in air or in gaseous oxidant formed wherein some portion (in this example 10%) of the oxygen required for complete combustion of the fuel is supplied by pure oxygen, and the balance supplied by air. Point "A" is the "inflection point" as defined hereinabove. At point "A" in this example, the stoichiometric ratio is about 0.585. For this example it was assumed that approximately 52 wt. % of the coal was in the vapor phase and participating in the reactions. Thus although the overall stoichiometric ratio is much less than 1, the gas phase may only be slightly fuel rich at this inflection point.

When the gas phase becomes fuel lean, in this example at a primary stage stoichiometric ratio greater than about 0.585, the effect of adding oxygen is to significantly increase NOx formation. However, it has now been discovered that there are lower stoichiometric ratios (below about 0.585 in this example, being the stoichiometric ratio at the point at which the two curves intersect), at which the effect of modestly increasing the overall oxygen content of the oxidant in the first stage (e.g. by addition of relatively modest amounts of pure or substantially enriched oxygen) is to dramatically decrease NOx formation. The present invention carries out combustion in the first stage (or in the fuel rich portion of a staged combustor) at stoichiometric ratios below the stoichiometric ratio at that point.

The preferred mode for practicing this invention is based on a combination of the requirements to facilitate staged combustion and materials or economic limitations. As noted, a principal objective of this invention is reduction of NOx formation, but another objective is of course remaining able to initiate and maintain combustion. If the stoichiometric ratio is too low, e.g. below approximately 0.4 in the example represented in the FIGURE, ignition and combustion in the first stage will be difficult. This lower bound is strongly dependent on the fuel characteristics, such as the amount of volatiles released in the first stage, and the oxidant characteristics. In the previously discussed example, the optimal range was approximately stoichiometric ratio of 0.4–0.585 based on the whole coal. This corresponds to a range of 0.575–0.85 based on the assumed fuel in the gas phase. As another example, feeding a significantly preheated stream of pure, or substantially enriched, oxygen will allow combustion at much lower stoichiometric ratios than an equivalent oxygen stream at lower temperatures. However, in any case it is noted that in the region where the stoichiometric ratio is below some critical value, about 0.4 in the previously discussed example, the NOx formation exceeds that which is achieved even without the oxygen addition and stoichiometric ratio control in accordance with the present invention.

In view of this, to be surer of achieving reduced NOx formation under a given set of combustion conditions (including a given oxidant stream(s) having an overall oxygen content somewhat greater than that of air), it is preferred to operate at a stoichiometric ratio which is below the stoichiometric ratio at the aforementioned inflection point at which combustion in air or in the given oxidant gas produce the same amount of NOx, but at least the lower stoichiometric ratio at which the NOx formation (obtained with the given oxidant stream(s)) has again risen and reached the value of the NOx formation at the aforementioned inflection point.

In other words, referring to the FIGURE, at point "A" (i.e. at the inflection point) the NOx formation is the same for combustion in air or in a gaseous oxidant wherein 10% of the oxygen required for combustion is supplied by pure oxygen and the balance from air, and at point "B" the NOx formation is the same as the NOx formation at point "A"; and it is preferred to carry out combustion at a stoichiometric ratio which is below the stoichiometric ratio at point "A" and at least the stoichiometric ratio at point "B".

The optimal stoichiometric ratios for operation depend strongly on the fuel characteristics, type of combustion device, fraction of the oxygen required for combustion that is supplied by pure, or substantially enriched oxygen, and average oxidant temperature. Several methods are available to determine the optimal operating regime. These include kinetic calculations as illustrated above, which give rise to important information on the kinetic limitations. These calculations must pay careful attention to the amount of fuel in the vapor phase under the fuel rich conditions to adequately describe fuel to oxygen ratio, and therefore NOx formation, in the vapor phase. Computational fluid dynamic (CFD) calculations can be used to take into account the impact of aerodynamic staging in a combustion device where some portion of the combustion air has been replaced with oxygen. Finally, experimentation can be used to verify the modeling results before installation of the device.

As can be seen, the effects discovered and described herein are based on increases in the overall oxygen content of the oxidant. The increases can be provided by literally replacing air with oxygen, or by other means such as adding oxygen-enriched air, replacing air with oxygen-enriched air, adding pure or nearly pure oxygen, or replacing air with pure or nearly pure oxygen. For convenience herein the increased overall oxygen content of the oxidant is most often referred to in terms of replacement of air with pure oxygen, meaning an oxidant that is the equivalent of air having been replaced in part with pure oxygen so as to maintain the same amount of oxygen. Given that air is understood to comprise about 20.9 vol. % oxygen, replacement of various given percentages of the air with oxygen produces oxidant with a higher overall oxygen content in accordance with the following table:

| Replacement of this vol. % of air with oxygen: | produces oxidant having this vol. % of oxygen: |
|---|---|
| 0 | 20.9 |
| 5 | 21.8 |
| 10 | 22.7 |
| 15 | 23.7 |
| 20 | 24.8 |
| 25 | 26.1 |
| 30 | 27.4 |
| 35 | 28.9 |
| 40 | 30.6 |

The practical overall oxygen content of the oxidant gas, whether effected by replacement of air with pure oxygen or otherwise, is based on lower limits where oxygen will not have enough impact to warrant its use and upper limits where cost is prohibitive or maintaining the boiler or furnace balance will be problematic. While pure oxygen, or substantially oxygen enriched oxidant streams, can be used to supply 25% or more, or even 30% or more, of the stoichiometric oxygen requirement for combustion, calculations based on the current cost of oxygen and the kinetics of NOx control suggest as an optimal range using gaseous oxidant containing 21.8 vol. % to 24.8 vol. % oxygen, i.e. corresponding to replacing between 5–20% of the total combustion air with oxygen (or any of the values between 5% and 20% such as appear in the foregoing table). When all of the oxygen is used in the first stage combustion zone and no oxygen is used in the second stage combustion zone, the optimum range of replacing the first stage combustion air with oxygen becomes much higher than the above range, which depends on the stoichiometric ratio of the first stage combustion zone.

Combustion air and combustion oxygen and oxygen-enriched air can be supplied as one stream or as more than one stream. The optimal method for delivering the oxygen, or substantially enriched oxidant stream, is based on maximizing NOx reduction and minimizing retrofit and system complexity. Consistent with these objectives, oxygen can be delivered to the first combustion zone by feeding it through a lance extending through the burner into that stage, or by feeding it through the walls adjacent to the burner. This method provides the highest effect of the increased oxygen concentration in the first combustion zone and allows a simple lance configuration to be installed. In addition, with this method the local oxygen concentration can be as high as the oxygen purity used for the process, which will enhance devolatilization of the fuel particles or droplets even further and help anchor the flame. This method would also allow preheated oxygen to be injected without the concern of premature ignition or softening of the fuel.

Other aspects of the practice of the present invention can be carried out in conventional manner which is familiar and readily ascertainable to those of ordinary skill in this art. Coal to be combusted is first pulverized to a fine particle size permitting it to be fed under gaseous pressure, through the feed orifice of a burner head for such purpose, into a furnace or like combustion device. Burner heads, techniques for feeding the pulverized coal, and furnaces and other combustion devices useful for combusting coal, suitable for use in this invention, are conventional. The stoichiometric ratio, and the oxygen content of the gaseous oxidant fed to the combustion zones, are adjusted by control means familiar to those with experience in this field. Combustion of fuel in accordance with the present invention is useful for recovering heat for power generation or for heating purposes.

A simple way to practice this invention is to inject oxygen into the windbox of a low NOx burner to provide oxidizer gas having the desired increased oxygen content, so that the resulting oxidant gas is fed to the entire furnace, including to the first combustion stage and making the first combustion stage more fuel rich by adjusting the air or fuel flow to the first stage. This would be a useful approach for staged combustion where the entire low nitrogen burner is operated fuel rich and overfire air is added further downstream in the boiler to complete fuel burnout. Another approach is to feed the majority of the oxygen to the primary, or fuel rich, stage to enhance the reactions forming $N_2$. The remaining oxygen is fed to either subsequent stages of the low nitrogen burner, or to overfire air, to promote burnout. The most preferred configuration is to feed all the oxygen to the first combustion stage through a lance and to reduce the flow rate of the first stage combustion air by an appropriate amount.

Oxygen enrichment can be achieved in a number of ways. One is to simply install a sparger in the boiler windbox so that the desired amount of oxygen mixes with all the combustion air before it enters the burner. Although this approach is the simplest, the NOx reduction efficiency will be reduced as compared to direct injection into the first combustion zone. Another method to deliver the somewhat oxygen enriched air to the burner is to pipe a premixed (air-oxygen) mixture directly into the first combustion zone. Although this would lead to better NOx reduction than simple mixing in the windbox, the additional piping and windbox modifications required may be less attractive than the optimal case.

The degree of oxygen enrichment can also be varied according to site-specific requirements. While it has been determined that increasing the oxygen replacement above 15% of the stoichiometric oxygen further enhances NOx reduction, the current cost of oxygen may make replacement of more than 40% of the air uneconomic compared to other methods of NOx control. Further, when the invention is used in retrofits to existing boilers and furnaces, or installed in new furnaces with conventional designs, there is an upper limit to the amount of oxygen that can be provided in place of air before boiler balance is detrimentally impacted. This limit is fuel and site specific, but is commonly 20 to 30% (corresponding to overall oxygen contents of 24.8% to 27.4% based on the mixture of the total combustion air and oxygen).

Another useful aspect of the present invention is to preheat the incoming oxygen, or substantially enriched oxidant. The preheated oxidant, heated to a temperature of up to 1800° F. or even to a temperature of up to 3000° F., will accelerate ignition of the fuel, enhance combustion in this zone, and increase volatile yield. Material issues for process piping will limit the upper temperature.

The invention can also be used to reduce boiler NOx by selectively enriching just those burners that have been shown to produce most of the NOx and unburned carbon in a given boiler.

The invention can also be used to regain boiler capacity that has been lost due to boiler balancing problems, such as when a boiler has switched from one fuel to a lower heating value fuel. For example, when a boiler switches from a bituminous coal to a subbituminous coal, the higher flue gas volume associated with a subbituminous coal typically causes problems with too much heat passing through the radiant section and being absorbed in the convective section. This often results in a derate of the boiler. However, when as little as 5% of the total combustion air is replaced with oxygen as part of the invention the flue gas volume becomes the same as that fired with a bituminous coal, thereby regaining lost boiler capacity.

When the present invention is carried out as the first stage of a staged combustion device having a second stage, the combustion products from the first stage (including unburned fuel, and flue gas) proceed to a second combustion stage. Additional air or oxygen is fed to this stage, and unburned fuel from the first stage is combusted. The combustion in this stage should be carried out so as to suppress NOx formation, and preferably to minimize NOx formation. Preferably, sufficient air or oxygen should be provided to achieve combustion of the unburned fuel to the maximum possible extent consistent with suppressed or minimized formation of NOx in this stage.

Another advantage of this invention is that combustion under the conditions described herein in the first combustion stage of a staged combustion device (or in the fuel rich region of a staged combustor) provides increased devolatilization of volatile matter from the fuel, so that the amount of char resulting under these conditions is expected to be dramatically lower, resulting in much better burnout than in conventional staged devices.

Yet another advantage of the present invention is that the flame in the first (or single) combustion stage is better attached to the burner orifice. This feature is advantageous because it corresponds to reduced NOx formation compared to situations in which the flame is detached from the burner, i.e. in which the base of the flame is some distance from the burner orifice. Furthermore, the replacement of a portion of combustion air with oxygen and more fuel rich operation of the first combustion stage result in a longer residence time in this stage which facilitates further reduction of NOx formation.

What is claimed is:

1. A method for combusting hydrocarbon fuel, comprising:

feeding into the fuel rich region of a single combustion stage or the fuel rich region of the first combustion stage of first and second combustion stages fuel containing one or more nitrogenous hydrocarbon compound and gaseous oxidant having an average oxygen concentration of more than 21 vol. % oxygen, at a stoichiometric ratio below that at which, if the stage were operated with air as the only oxidant, the same amount of NOx would be produced, and combusting said fuel with said gaseous oxidant in said single or first combustion stage to produce combustion products and unburned fuel, further comprising combusting said unburned fuel in a second combustion stage with additional gaseous oxidant comprised such that the average oxygen content of the oxidant fed to said first and second stages is in the range of 20.9–27.4 vol. % oxygen while removing sufficient heat from the combustion products and unburned fuel produced in said single or first stage to reach a temperature low enough to minimize additional formation of NOx in said combustion in said second stage.

2. A method according to claim 1 further comprising heating the oxidant before it is fed to said fuel rich region.

3. A method according to claim 1 wherein the stoichiometric ratio in said fuel rich region is below that at which, if the fuel rich region were operated with air as the only oxidant, the same amount of NOx would be produced, but is at least the lower stoichiometric ratio at which the amount of NOx formed by combustion of said fuel with said oxidant under otherwise identical conditions is said same amount.

4. A method according to claim 1 wherein said fuel is coal.

5. A method according to claim 4 further comprising heating the oxidant before it is fed to said fuel rich region.

6. A method according to claim 4 wherein the stoichiometric ratio in said fuel rich region is below that at which, if the fuel rich region were operated with air as the only oxidant, the same amount of NOx would be produced, but is at least the lower stoichiometric ratio at which the amount of NOx formed by combustion of said fuel with said oxidant under otherwise identical conditions is said same amount.

7. A method according to claim 4 wherein the average oxygen concentration of the oxidant fed to said fuel rich region is up to 21.8 vol. %.

8. A method according to claim 4 wherein said gaseous oxidant is fed to said fuel rich region by feeding one stream or more than one stream of oxygen enriched air, or by feeding one stream or more than one stream of air and one stream or more than one stream of oxygen or oxygen-enriched air.

9. A method according to claim 4 wherein the average oxygen concentration of the oxidant fed to said fuel rich region is up to 24.8 vol. %.

10. A method according to claim 1 wherein the average oxygen concentration of the oxidant fed to said fuel rich region is up to 21.8 vol. %.

11. A method according to claim 1 wherein said gaseous oxidant is fed to said fuel rich region by feeding one stream or more than one stream of oxygen enriched air, or by feeding one stream or more than one stream of air and one stream or more than one stream of oxygen or oxygen enriched air.

12. A method according to claim 1 wherein the average oxygen concentration of the oxidant fed to said fuel rich region is up to 24.8 vol. %.

13. A method for retrofitting a furnace in which a hydrocarbon fuel is combusted in air as the only oxidant, so as to reduce the amount of NOx formed by the furnace compared to the amount of NOx formed by combustion of said fuel in said furnace with air as the only oxidant, comprising:

feeding into the fuel rich region of a single combustion stage or the fuel rich region of the first combustion stage of first and second combustion stages of said furnace fuel containing one or more nitrogenous hydrocarbon compound and gaseous oxidant having an average oxygen concentration of more than 21 vol. % oxygen, at a stoichiometric ratio below that at which, if the stage were operated with air as the only oxidant, the same amount of NOx would be produced, and combusting said fuel with said gaseous oxidant in said single or first combustion stage to produce combustion products and unburned fuel, further comprising combusting said unburned fuel in a second combustion stage with additional gaseous oxidant comprised such that the average oxygen content of the oxidant fed to said first and second stages is in the range of 20.9–27.4 vol. % oxygen while removing sufficient heat from the combustion products and unburned fuel produced in said single or first stage to reach a temperature low enough to minimize additional formation of NOx in said combustion in said second stage.

14. A method according to claim 13 further comprising heating the oxidant before it is fed to said fuel rich region.

15. A method according to claim 13 wherein the stoichiometric ratio in said fuel rich region is below that at which, if the fuel rich region were operated with air as the only oxidant, the same amount of NOx would be produced, but is at least the lower stoichiometric ratio at which the amount of NOx formed by combustion of said fuel with said oxidant under otherwise identical conditions is said same amount.

16. A method according to claim 13 wherein said fuel is coal.

17. A method according to claim 16 further comprising heating the oxidant before it is fed to said fuel rich region.

18. A method according to claim 16 wherein the stoichiometric ratio in said fuel rich region is below that at which, if the fuel rich region were operated with air as the only oxidant, the same amount of NOx would be produced, but is at least the lower stoichiometric ratio at which the amount of NOx formed by combustion of said fuel with said oxidant under otherwise identical conditions is said same amount.

19. A method according to claim 16 wherein the average oxygen concentration of the oxidant fed to said fuel rich region is up to 21.8 vol. %.

20. A method according to claim 16 wherein said gaseous oxidant is fed to said fuel rich region by feeding one stream or more than one stream of oxygen-enriched air, or by feeding one stream or more than one stream of air and one stream or more than one stream of oxygen or oxygen enriched air.

21. A method according to claim 16 wherein the average oxygen concentration of the oxidant fed to said fuel rich region is up to 24.8 vol. %.

22. A method according to claim 13 wherein the average oxygen concentration of the oxidant fed to said fuel rich region is up to 21.8 vol. %.

23. A method according to claim 13 wherein said gaseous oxidant is fed to said fuel rich region by feeding one stream or more than one stream of oxygen enriched air, or by feeding one stream or more than one stream of air and one stream or more than one stream of oxygen or oxygen enriched air.

24. A method according to claim 13 wherein the average oxygen concentration of the oxidant fed to said fuel rich region is up to 24.8 vol. %.

25. A method for combusting hydrocarbon fuel, comprising:

feeding into the fuel rich region of a single combustion stage or the fuel rich region of the first combustion stage of first and second combustion stages fuel containing one or more nitrogenous hydrocarbon compound and gaseous oxidant having an average oxygen concentration of more than 21 vol. % oxygen, at a stoichiometric ratio below that at which, if the stage were operated with air as the only oxidant, the same amount of NOx would be produced, and combusting said fuel with said gaseous oxidant in said single or first combustion stage to produce combustion products and unburned fuel, and feeding air downstream of said fuel rich region and combusting said unburned fuel in said air downstream of said fuel rich region, wherein said unburned fuel is combusted downstream of said fuel rich region with additional gaseous oxidant comprised such that the average oxygen content of the oxidant fed to said fuel rich region and said additional gaseous oxidant is in the range of 20.9–27.4 vol. % oxygen while removing sufficient heat from the combustion products and unburned fuel produced in the fuel rich region to reach a temperature low enough to minimize additional formation of NOx in said combustion of said unburned fuel.

26. A method according to claim 25 wherein the average oxygen concentration of the oxidant fed to said fuel rich region is up to 21.8 vol. %.

27. A method according to claim 25 wherein said gaseous oxidant is fed to said fuel rich region by feeding one stream or more than one stream of oxygen enriched air, or by feeding one stream or more than one stream of air and one stream or more than one stream of oxygen or oxygen enriched air.

28. A method according to claim 25 further comprising heating the oxidant before it is fed to said fuel rich region.

29. A method according to claim 25 wherein the stoichiometric ratio in said fuel rich region is below that at which, if the fuel rich region were operated with air as the only oxidant, the same amount of NOx would be produced, but is at least the lower stoichiometric ratio at which the amount of NOx formed by combustion of said fuel with said oxidant under otherwise identical conditions is said same amount.

30. A method according to claim 25 wherein the average oxygen concentration of the oxidant fed to said fuel rich region is up to 24.8 vol. %.

31. A method according to claim 25 wherein said fuel is coal.

32. A method according to claim 31 wherein the average oxygen concentration of the oxidant fed to said fuel rich region is up to 21.8 vol. %.

33. A method according to claim 31 wherein said gaseous oxidant is fed to said fuel rich region by feeding one stream or more than one stream of oxygen-enriched air, or by feeding one stream or more than one stream of air and one stream or more than one stream of oxygen or oxygen enriched air.

34. A method according to claim 31 further comprising heating the oxidant before it is fed to said fuel rich region.

35. A method according to claim 31 wherein the stoichiometric ratio in said fuel rich region is below that at which, if the fuel rich region were operated with air as the only oxidant, the same amount of NOx would be produced, but is at least the lower stoichiometric ratio at which the amount of NOx formed by combustion of said fuel with said oxidant under otherwise identical conditions is said same amount.

36. A method according to claim 31 wherein the average oxygen concentration of the oxidant fed to said fuel rich region is up to 24.8 vol. %.

37. A method for combusting hydrocarbon fuel, comprising:

feeding into the fuel rich region of a single combustion stage or the fuel rich region of the first combustion stage of first and second combustion stages fuel containing one or more nitrogenous hydrocarbon compound and gaseous oxidant having an average oxygen concentration of more than 21 vol. % oxygen, at a stoichiometric ratio below that at which, if the stage were operated with air as the only oxidant, the same amount of NOx would be produced, and combusting said fuel with said gaseous oxidant in said single or first combustion stage to produce combustion products and unburned fuel, wherein the stoichiometric ratio in said fuel rich region is below that at which, if the fuel rich region were operated with air as the only oxidant, the same amount of NOx would be produced, but is at least the lower stoichiometric ratio at which the amount of NOx formed by combustion of said fuel with said oxidant under otherwise identical conditions is said same amount.

38. A method according to claim 37 further comprising heating the oxidant before it is fed to said fuel rich region.

39. A method according to claim 37 wherein said fuel is coal.

40. A method according to claim 39 further comprising heating the oxidant before it is fed to said fuel rich region.

41. A method according to claim 39 wherein the average oxygen concentration of the oxidant fed to said fuel rich region is up to 21.8 vol. %.

42. A method according to claim 39 wherein the average oxygen concentration of the oxidant fed to said fuel rich region is up to 24.8 vol. %.

43. A method according to claim 37 wherein the average oxygen concentration of the oxidant fed to said fuel rich region is up to 21.8 vol. %.

44. A method according to claim 37 wherein the average oxygen concentration of the oxidant fed to said fuel rich region is up to 24.8 vol. %.

45. A method for retrofitting a furnace in which a hydrocarbon fuel is combusted in air as the only oxidant, so as to reduce the amount of NOx formed by the furnace compared to the amount of NOx formed by combustion of said fuel in said furnace with air as the only oxidant, comprising:

feeding into the fuel rich region of a single combustion stage or the fuel rich region of the first combustion stage of first and second combustion stages of said furnace fuel containing one or more nitrogenous hydrocarbon compound and gaseous oxidant having an average oxygen concentration of more than 21 vol. % oxygen, at a stoichiometric ratio below that at which, if the stage were operated with air as the only oxidant, the same amount of NOx would be produced, and combusting said fuel with said gaseous oxidant in said single or first combustion stage to produce combustion products and unburned fuel, wherein the stoichiometric ratio in said fuel rich region is below that at which, if the fuel rich region were operated with air as the only oxidant, the same amount of NOx would be produced, but is at least the lower stoichiometric ratio at which the amount of NOx formed by combustion of said fuel with said oxidant under otherwise identical conditions is said same amount.

46. A method according to claim 45 further comprising heating the oxidant before it is fed to said fuel rich region.

47. A method according to claim 45 wherein said fuel is coal.

48. A method according to claim 47 further comprising heating the oxidant before it is fed to said fuel rich region.

49. A method according to claim 47 wherein the average oxygen concentration of the oxidant fed to said fuel rich region is up to 21.8 vol. %.

50. A method according to claim 47 wherein the average oxygen concentration of the oxidant fed to said fuel rich region is up to 24.8 vol. %.

51. A method according to claim 47 wherein the average oxygen concentration of the oxidant fed to said fuel rich region is up to 21.8 vol. %.

52. A method according to claim 45 wherein the average oxygen concentration of the oxidant fed to said fuel rich region is up to 24.8 vol. %.

53. A method for combusting hydrocarbon fuel, comprising:

feeding into the fuel rich region of a single combustion stage or the fuel rich region of the first combustion stage of first and second combustion stages fuel containing one or more nitrogenous hydrocarbon compound and gaseous oxidant having an average oxygen concentration of more than 21 vol. % oxygen, at a stoichiometric ratio below that at which, if the stage were operated with air as the only oxidant, the same amount of NOx would be produced, and combusting said fuel with said gaseous oxidant in said single or first combustion stage to produce combustion products and unburned fuel, and feeding air downstream of said fuel rich region and combusting said unburned fuel in said air downstream of said fuel rich region, wherein the stoichiometric ratio in said fuel rich region is below that at which, if the fuel rich region were operated with air as the only oxidant, the same amount of NOx would be produced, but is at least the lower stoichiometric ratio at which the amount of NOx formed by combustion of said fuel with said oxidant under otherwise identical conditions is said same amount.

54. A method according to claim 53 further comprising heating the oxidant before it is fed to said fuel rich region.

55. A method according to claim 53 wherein said fuel is coal.

56. A method according to claim 55 further comprising heating the oxidant before it is fed to said fuel rich region.

57. A method according to claim 55 wherein the average oxygen concentration of the oxidant fed to said fuel rich region is up to 21.8 vol. %.

58. A method according to claim 55 wherein the average oxygen concentration of the oxidant fed to said fuel rich region is up to 24.8 vol. %.

59. A method according to claim 53 wherein the average oxygen concentration of the oxidant fed to said fuel rich region is up to 21.8 vol. %.

60. A method according to claim 53 wherein the average oxygen concentration of the oxidant fed to said fuel rich region is up to 24.8 vol. %.

61. A method for combusting hydrocarbon fuel, comprising:

feeding into the fuel rich region of a single combustion stage or the fuel rich region of the first combustion stage of first and second combustion stages fuel containing one or more nitrogenous hydrocarbon compound and gaseous oxidant having an average oxygen concentration of more than 21 vol. % oxygen, at a stoichiometric ratio below that at which, if the stage were operated with air as the only oxidant, the same amount of NOx would be produced, and combusting said fuel with said gaseous oxidant in said single or first combustion stage to produce combustion products and unburned fuel, further comprising combusting said unburned fuel in a second combustion stage downstream of said first stage with additional gaseous oxidant comprised such that the average oxygen content of the oxidant fed to said first and second stages is in the range of 20.9–27.4 vol. % oxygen while removing sufficient heat from the combustion products and unburned fuel produced in said single or first stage to reach a temperature low enough to minimize additional formation of NOx in said combustion in said second stage.

62. A method according to claim 61 further comprising heating the oxidant before it is fed to said fuel rich region.

63. A method according to claim 61 wherein the stoichiometric ratio in said fuel rich region is below that at which, if the fuel rich region were operated with air as the only oxidant, the same amount of NOx would be produced, but is at least the lower stoichiometric ratio at which the amount of NOx formed by combustion of said fuel with said oxidant under otherwise identical conditions is said same amount.

64. A method according to claim 61 wherein said fuel is coal.

65. A method according to claim 64 further comprising heating the oxidant before it is fed to said fuel rich region.

66. A method according to claim 64 wherein the stoichiometric ratio in said fuel rich region is below that at which, if the fuel rich region were operated with air as the only oxidant, the same amount of NOx would be produced, but is at least the lower stoichiometric ratio at which the amount of NOx formed by combustion of said fuel with said oxidant under otherwise identical conditions is said same amount.

67. A method according to claim 64 wherein the average oxygen concentration of the oxidant fed to said fuel rich region is up to 21.8 vol. %.

68. A method according to claim 64 wherein the average oxygen concentration of the oxidant fed to said fuel rich region is up to 24.8 vol. %.

69. A method according to claim 61 wherein the average oxygen concentration of the oxidant fed to said fuel rich region is up to 21.8 vol. %.

70. A method according to claim 61 wherein the average oxygen concentration of the oxidant fed to said fuel rich region is up to 24.8 vol. %.

71. A method for retrofitting a furnace in which a hydrocarbon fuel is combusted in air as the only oxidant, so as to reduce the amount of NOx formed by the furnace compared to the amount of NOx formed by combustion of said fuel in said furnace with air as the only oxidant, comprising:

feeding into the fuel rich region of a single combustion stage or the fuel rich region of the first combustion stage of first and second combustion stages of said furnace fuel containing one or more nitrogenous hydrocarbon compound and gaseous oxidant having an average oxygen concentration of more than 21 vol. % oxygen, at a stoichiometric ratio below that at which, if the stage were operated with air as the only oxidant, the same amount of NOx would be produced, and combusting said fuel with said gaseous oxidant in said single or first combustion stage to produce combustion products and unburned fuel, further comprising combusting said unburned fuel in a second combustion stage downstream of said first stage with additional gaseous oxidant comprised such that the average oxygen content of the oxidant fed to said first and second stages is in the range of 20.9–27.4 vol. % oxygen while removing sufficient heat from the combustion products and unburned fuel produced in said single or first stage to reach a temperature low enough to minimize additional formation of NOx in said combustion in said second stage.

72. A method according to claim 71 further comprising heating the oxidant before it is fed to said fuel rich region.

73. A method according to claim 71 wherein the stoichiometric ratio in said fuel rich region is below that at which, if the fuel rich region were operated with air as the only oxidant, the same amount of NOx would be produced, but is at least the lower stoichiometric ratio at which the amount of NOx formed by combustion of said fuel with said oxidant under otherwise identical conditions is said same amount.

74. A method according to claim 71 wherein said fuel is coal.

75. A method according to claim 74 further comprising heating the oxidant before it is fed to said fuel rich region.

76. A method according to claim 74 wherein the stoichiometric ratio in said fuel rich region is below that at which, if the fuel rich region were operated with air as the only oxidant, the same amount of NOx would be produced, but is at least the lower stoichiometric ratio at which the amount of NOx formed by combustion of said fuel with said oxidant under otherwise identical conditions is said same amount.

77. A method according to claim 74 wherein the average oxygen concentration of the oxidant fed to said fuel rich region is up to 21.8 vol. %.

78. A method according to claim 74 wherein the average oxygen concentration of the oxidant fed to said fuel rich region is up to 24.8 vol. %.

79. A method according to claim 71 wherein the average oxygen concentration of the oxidant fed to said fuel rich region is up to 21.8 vol. %.

80. A method according to claim 71 wherein the average oxygen concentration of the oxidant fed to said fuel rich region is up to 24.8 vol. %.

* * * * *